Feb. 4, 1969 A. F. SMITH 3,425,139
MODERN MATH AND READING TEACHING-AID-GAME
Filed May 26, 1967 Sheet 2 of 2

INVENTOR
ALEENE F. SMITH

BY Larson and Taylor
ATTORNEYS

United States Patent Office 3,425,139
Patented Feb. 4, 1969

3,425,139
MODERN MATH AND READING TEACHING-AID-GAME
Aleene F. Smith, P.O. Box 191,
Oakboro, N.C. 28129
Filed May 26, 1967, Ser. No. 641,593
U.S. Cl. 35—31                                24 Claims
Int. Cl. G09b 23/02, 1/06

ABSTRACT OF THE DISCLOSURE

A teaching aid for illustrating various arithmetic relationships in the form of a reading and math game having a backboard which includes a "one's" area, a "ten's" area and a "hundred's" area. Each area has formed thereon a representation of a human figure with its fingers numbered one through ten consecutively, each finger having a device for selectively exposing or covering the numerals of that finger. The figures also have holding elements for holding label cards and number cards. The backboard further includes movable information display areas, scoreboard areas, and a card storage area.

Background—Field of the invention

This invention relates to teaching aids, and in particular it relates to a teaching aid in the form of a game wherein scoring in the game is accomplished by solving problems in math, reading, etc.

Background—Description of the prior art

The present inveniton is formed by a unique combination of several features. On the one hand it is a mathematical teaching aid including a novel counting device for counting "one's," "ten's," and "hundred's." It is also a game which includes means for presenting problems, and which utilizes the counting device both to solve problems and to keep score in the game. The essence of the invention is to visually demonstrate the math and to encourage learning in math, reading or other areas by making it a game.

The closest prior art of which applicant is aware is the patent to Rice. No. 3,280,480, which discloses a mathematical teaching aid employing a plurality of beads which may be moved from place to place to illustrate various mathematical relationships.

However, applicant is aware of no prior art which suggests the concept of the present invention of providing a teaching aid for mathematics, reading and the like in a form to be used as a game to encourage learning by competition.

Summary of the invention

Many students encounter great difficulty in mastering the various concepts of elementary arithmetic. Among the concepts that are most difficult is the idea of place values, that is, the relationship of the "one's," "ten's" and the "hundred's." If the relationships of the various numbers are not understood this will hinder learning of various mathematical relationships including at least addition, subtraction, multiplication and division.

The primary object of the present invention is to provide a game-type teaching aid which clearly represents, in a tangible way, the place value concept, and which can be manipulated to illustrate for the student, the basic principles of arithmetic relationships. The concept of providing the teaching aid in the form of a game facilitates the learning procedure. Any time that subject matter is placed into the form of a game for a child to play, the child will learn faster because of the added stimulation of succeeding in the game.

According to the present invention there is provided a teaching-aid-game in the form of a backboard including on the surface thereof a "one's" area, a "ten's" area and a "hundred's" area. Each of these areas includes a representation of a human figure referred to hereinafter as "math men." Each of the ten figures of each math man is provided with a different number from one to ten. Further, each finger includes a device for selectively covering or exposing the number of that finger. Thus, in the process of teaching or playing a game with the teaching-aid-game, the numbers may be initially covered and then uncovered consecutively from one upward.

Each math man also includes a first mounting element which may be in the area of the head for mounting a label to identify that particular man, that is, whether it is a "one's" man, a "ten's" man or a "hundred's" man, and a second mounting element which may be in the area of the chest for mounting a number card to illustrate the total number counted by the individual fingers of that man at various times during the teaching or playing of the game.

The second mounting elements may be used for scoring purposes or they may be used for other purposes. When used for other purposes it will be necessary to keep score in another manner. For this purpose additional scoring areas are provided on the backboard for displaying scores of individual players during the process of the game. Such individual scoring areas will include elements for mounting a "one's" digit, a "ten's" digit and a "hundred's" digit.

The backboard is also provided with a storage area for storing unused face and chest cards.

According to another feature of the invention two face cards are provided for each math man. A first set of face cards indicate the function of the man in terms familiar to the child before the child has mastered the concept of place values. For example, the "one's" man will have a face card with the letter C thereon to indicate that he is the "counting man." The "ten's" man will have a face card with the letter M thereon to indicate that he is the "memory man" since he memorizes the amount of times that the "counting man" has counted consecutively from one to ten. Similarly, the "hundred's" man may have a face card with TT formed thereon to indicate the "ten-ten's" man. As the child understands the true function of the three math men, that is, understands the place value concept, the first face card on the "one's" man may be replaced with a face card with the letter O thereon to indicate "one's"; similarly, the face cards on the "ten's" and "hundred's" men may be replaced by second face cards with the letters T and H respectively, formed thereon.

In one application of the teaching-aid-game the child may be asked to read words and every time that a word is read correctly he will simply count one more number on the math men. It is apparent that the child could count nine-hundred-and-ninety-nine correct words before expiring the places on the math men.

For operating the teaching-aid-game in this manner there may be provided within the backboard a display window for visually displaying and continuously changing words for the child to read. For example, a series of words may be placed on a roller, a portion of which is exposed through a window in the backboard and wherein the device includes rolling elements for advancing the roller.

The teaching-aid-game may also include a second window in the face of the backboard for presenting mathematical problems. These problems may be mounted on a roller and advanced by rolling elements the same as the reading problems. The math problems may be worded in such a way as to require the student to manipulate the sliding fingers of the math men in order to answer the question. Thus, when answering math questions of this nature, the math men cannot be used to keep a consecutive score. The separate scoreboard areas on the backboard may be employed for this purpose.

Thus, it is an object of the present invention to provide a new and unique teaching-aid-game.

It is another object of this invention to provide a new and unique teaching aid in the form of a teaching-aid-game to facilitate the learning of problems in math, reading and the like.

It is still another object of this invention to provide a teaching aid having three human figures formed therein, each figure having sliding fingers which may be manipulated for visually and tangibly illustrating various mathematical relationships.

It is still another object of this invention to provide a teaching-aid-game including a backboard having three human figures formed thereon, each having slidable fingers with means for exposing and covering numerals from one to ten, one number on each finger and including further means for keeping score and for changeably displaying problem data.

Other objects and the attendant advantages of the present invention will become apparent from the detailed description to follow together with the accompanying drawings.

*Brief description of the drawings*

It is to be understood that the detailed description to follow, together with the accompanying drawings, are intended solely for the purpose of illustrating a preferred embodiment of the invention. It is to be understood, however, that the invention is capable of numerous modifications and variations apparent to those skilled in the art without departing from the spirit and scope of the invention as set forth in the claims.

In the drawings.

*Description of the preferred embodiments*

Figure 1:
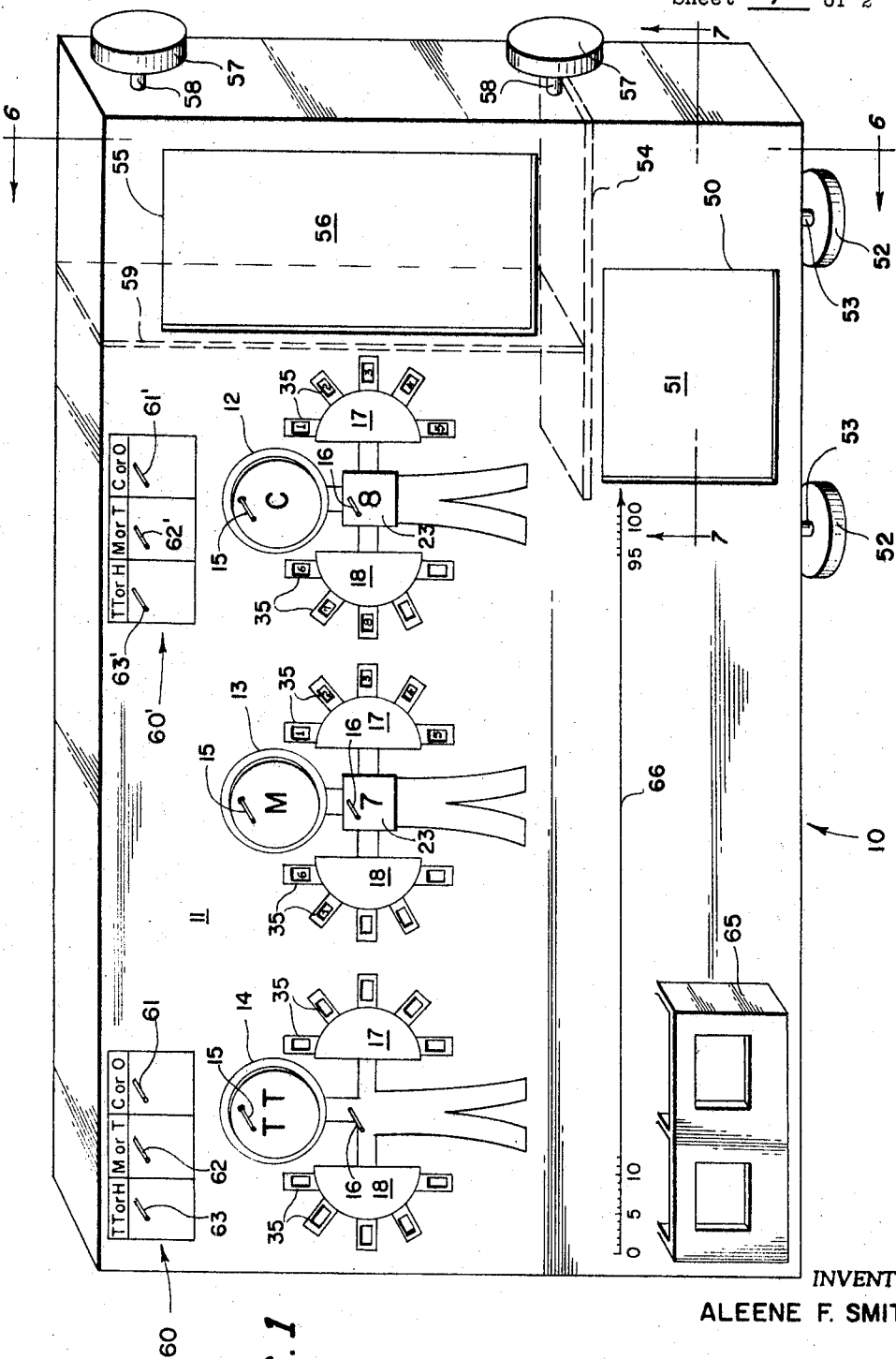
FIGURE 1 is a perspective view of the teaching-aid-game constructed and arranged according to the present invention.

Referring now to the figures, and in particular to FIGURE 1 there is shown a mathematical teaching-aid-game 10 having a backboard 11. The backboard 11 includes three representations of human figures including a first man 12 which is the "counting man" or "one's" man, a second man 13, which is the "memory" or "ten's" man and a third man 14, which is the "ten-ten's" or the "hundred's" man. Each of the men 12, 13, and 14 include a peg 15 in the vicinity of the face for mounting a face card and a peg 16 in the vicinity of the chest for mounting a chest card.

Figure 2:
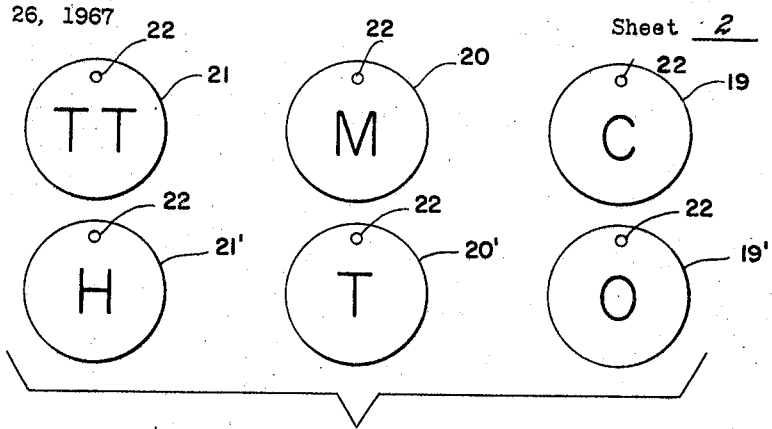
FIGURE 2 illustrates a set of face cards to be used with the present invention.

A set of typical face cards are shown in FIGURE 2, each having an aperture 22 to fit on the peg 15. The first set of cards, 19, 20, and 21 include the letters C, M and TT for labelling the men in a manner recognizable to a child not familiar with the place concept. Thus, the letter C may stand for a "counting" man, the letter M for a "memory" man (since the second man remembers and counts each time that the counting man counts to ten), and the third man may be referred to as the "ten-ten's" man. As the child grasps the concept of place values the C label is replaced by the label 19′ with the letter O thereon to represent the "one's" man. Similarly, the M label is replaced by label 20′ to represent the "ten's" man and the label 21 is replaced by the label 21′ to represent the "hundred's" man.

The chest pegs 16 may be used for number cards 23 which may be used at various times during the course of a game or a teaching procedure. It is, of course, apparent that the pegs 15 may be used for numbers and the pegs 16 for labels.

Each of the men further include a left and right hand 17 and 18 respectively. Each hand includes five fingers 35 and the fingers are numbered consecutively from one to five on one hand and from six to ten on the other hand. Each finger further includes a suitable means for exposing or covering the numeral thereon.

Figure 3:
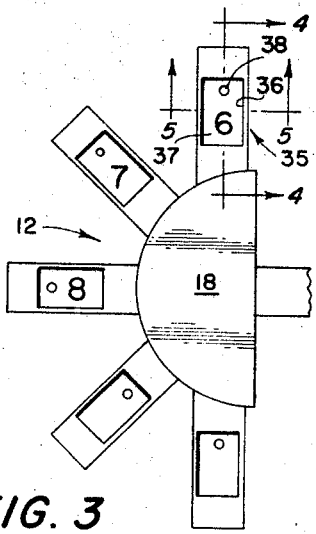
FIGURE 3 is a blown up view of a right hand of one of the math men.
Figure 4:
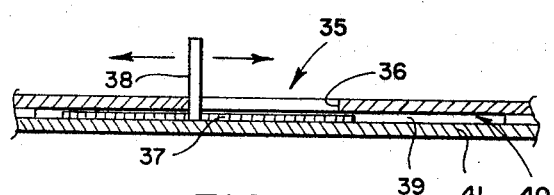
FIGURE 4 is a blown-up sectional view of the "six" finger of FIGURE 3 taken along line 4—4 of FIGURE 3.
Figure 5:
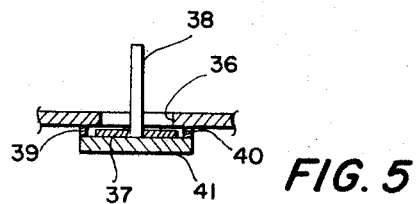
FIGURE 5 is a blown-up sectional view of the "six" finger of FIGURE 3 taken along line 5—5 of FIGURE 3.

FIGURE 3 illustrates an enlarged view of a left hand 18 of the math man 12 including five fingers 35 thereon with the numerals six through eight exposed. FIGURES 4 and 5 illustrate in detail an enlarged view of one suitable arrangement for exposing and covering the numeral of a finger.

In this particular embodiment the finger includes a window 36 and a slide member 37 mounted therebeneath and having a peg 38 and a numeral "6" formed thereon, the member 37 being slidable in the slot 40. The slot 40 includes side walls 39 and a bottom 41. Thus, by moving the peg 38 in the direction of the arrows as shown in FIGURE 4, the numeral "6" may be either exposed or covered through the window 36.

It should be apparent that other arrangements may be provided for exposing and covering the numeral. For example, the slide member 37 could be a cover which merely exposed and covered a numeral printed on the bottom 41. Similarly, the walls 39 and the slot 40 could be formed above the surface of backboard 11 with a numeral printed in a manner such as to be covered and uncovered by a member slidable over the top of the finger 35, thereby eliminating the need for a window.

Figure 6:
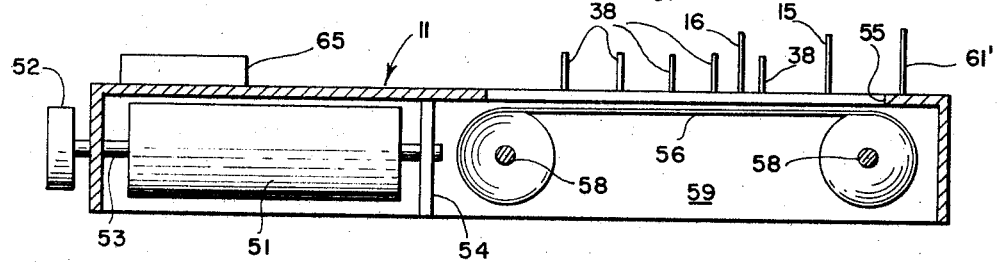
FIGURE 6 is a sectional view of the teaching-aid-game taken along line 6—6 of FIGURE 1.
Figure 7:
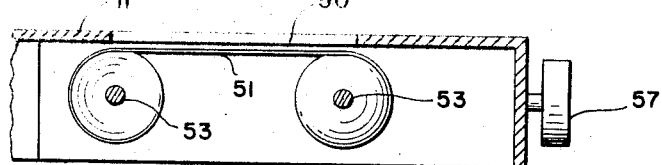
FIGURE 7 is a partial section view of the teaching-aid-game taken along line 7—7 of FIGURE 1.

The purpose of the teaching-aid-game is to facilitate solving mathematical, reading and other problems. Thus, for this purpose, means are provided on the teaching aid 11 for displaying data in the form of problems. A first means includes a window 50 referred to hereinafter as the "math" window which may be used for displaying math questions and problems. Referring to FIGURES 1, 6 and 7, the math window 50 has formed therebeneath a math question roll 51 mounted on rollers 53 and movable by knobs 52 which extend from a side wall of the backboard to a partition wall 54.

The backboard also includes a means for mounting a second body of information in the form of a window 55 referred to hereinafter as the "reading" window having mounted therebeneath a reading roll of information 56 mounted on rollers 58 and movable by knobs 57.

The backboard 11 includes other features for facilitating manipulation of the board for teaching or playing a game. There is provided a scoreboard 60 including a "one's," "ten's" and "hundred's" pegs, 61, 62 and 63 respectively for mounting numbers thereon. A second scoreboard 60′ with pegs 61′, 62′ and 63′ may also be provided. In addition, the board may include a storage area 65 for storing face cards 19–21 and 19′–21′ and number cards 23. Finally, a number line 66 may be provided on the board to facilitate counting.

By way of illustration, the teaching-aid-game of the present invention may be put to use to facilitate learning in the following manner.

First, as a reading game played by one child, the game would start with all of the sliding fingers closed and the first set of labels C, M and TT on the faces of math men 12, 13 and 14 respectively. These cards will indicate to a child not familiar with the place concept the purpose of the three men. One of the knobs 57 would then be turned until a word or a series of words on roll 56 appeared in the window 55. The child would then read the word and if he read the word correctly he would uncover the "1" on the first finger of the C man. After counting ten words correctly he would close all of the fingers on the C man and uncover the 1 on the first finger on the M man. The purpose of the memory man would be to "memorize" how many times the counting man has counted to ten. Similarly, after all ten fingers of the M man have been uncovered, all fingers would be closed and the first finger on the TT man would be opened. When a word is missed, or when a time period has elapsed, number cards 23 would be placed on the pegs 16 to indicate the highest number opened on each man. For example, as illustrated in FIGURE 1, the child has stopped after reciting seventy-eight words correctly. The child may now observe the correlation between the number of fingers on each man and the number on the chests of the men. By placing these numbers together the child will realize the significance of the counting procedure which has led to the number 78. Of course, by this procedure the board can be used to count to nine-hundred-and-ninety-nine. At some time during the counting procedure the child will probably come to understand the purpose of the three men. When he realizes that the "counting" man is recording the "one's" he can replace the C with the O face card. Similarly, the M face card can be replaced with a T and the TT with an H.

For two players to play the game each player would read words and count the correct words until he missed a word. He would then move his cards 23 to the score board 60. All of the sliding fingers would then be moved back to cover all the numerals and the second player would then read until he missed a word, counting the words and then placing his score in the score board 60'. The first player would then return his cards 23 to the peg 16, open the fingers to the numbers indicated and continue to read words to increase the score.

The teaching-aid-game may also be used for mathematical problems. For this purpose the mathematical problems would be printed on the roll 51 and visible through window 50. The mathematical games may be of two basic types. First, the problems may require either an oral or written answer. Here the child may count his correct answers in the same manner as in the reading game. In another type of mathematical game the problems may require that the child actually manipulate the sliding fingers of the counting men to answer the problem. Here, since the board will not be available for continuous scoring, the score could be kept on score boards 60 and 60'.

In teaching addition, the problem could require that the child add 3+2. The child would uncover the numbers on fingers "1," "2" and "3," and then he would uncover the numbers "4" and "5" to find the answer "5." To solve the problem 42+3, the child would open four fingers on the "ten's" man, two on the "one's" man and then three more on the "one's" man to arrive at the answer "45." Similarly, the child could solve the problem, 214+10 by opening two fingers, one finger and four fingers on the "hundred's," "ten's" and "one's" man respectively and then opening another finger on the "ten's" man. Similarly, to solve a subtraction problem, the minuend would be placed on the board and then the number of fingers represented by the subtrahend would be closed and the remaining open fingers would indicate the difference.

To solve a division problem the player would open the correct number of fingers to indicate a dividend and then count the groups or sets of the divisor. For example, to solve the problem 6÷3, the player would uncover fingers "1" to "6" on the one's man and count the groups of three contained therein.

Similarly, in multiplication the player would open the fingers a number of times indicated by one multiplier and continue to do the same for the number of times indicated by the other multiplier. For example, to solve the problem 2×3, the player would uncover two fingers and then two more and then two more (that is, three times) and find the answer "6."

Similarly, the math problems may require that the child manipulate the board to show the answer. For example, a problem can require that the player open the correct fingers to show the number "78."

Although the invention has been illustrated and described above in considerable detail with respect to a preferred embodiment thereof, it should be apparent that the invention is capable of numerous modifications and variations apparent to those skilled in the art without departing from the spirit and scope of the invention as set forth in the appended claims.

I claim:

1. A teaching aid comprising, a backboard, said backboard including three counting areas located in close proximity to each other, the first area being a "one's" area, the second area being a "ten's" area and the third area being a "hundred's" area; each of said areas having formed thereon a representation of a human figure, the representation of the ten fingers of the human figure each including a different numeral from one to ten and a movable means on each finger for selectively exposing or covering the numeral formed thereon.

2. A teaching aid as claimed in claim 1 wherein each of said fingers includes a slot formed on the board at each finger, a sliding member mounted in the slot, and said movable means including a means for sliding the said slidable member within the slot to selectively expose or cover the said numeral.

3. A teaching aid as claimed in claim 2 wherein the backboard further includes, for each representation of a human figure, at least a first holding element for mounting a card on the said figure.

4. A teaching aid as claimed in claim 3 wherein the backboard further includes a second holding element for holding a second card on the figure, the first element arranged to hold a card over the face of the figure and the second element arranged to hold a card over the body of the figure.

5. A teaching aid as claimed in claim 4, further including a set of two cards for each figure adapted to be mounted on the said first element of its respective figure, the cards of each set having information formed thereon to designate in which of the said areas the respective figure is located.

6. A teaching aid as claimed in claim 4 including, for each figure, any set of number cards, each set including one card for each number from one to ten, the said number cards being adapted to be mounted on the said second holding element.

7. A teaching aid as claimed in claim 2 wherein the numeral is formed on the bottom of the slot, and wherein movement of the said member selectively covers or exposes the numeral.

8. A teaching aid as claimed in claim 2 wherein the said fingers have a window opened through the finger and the backboard, and wherein the said slot and the said sliding members are mounted behind the said backboard behind the open window.

9. A teaching aid as claimed in claim 8 wherein the slot has a stationary base and wherein the numeral is formed on the base, behind and facing the open window, and wherein movement of the slidable member selectively covers or exposes the numeral.

10. A teaching aid as claimed in claim 8 wherein the numeral is formed on the sliding member and wherein said member is slidably mounted in said slot to selectively expose, through the window, either the numeral or a blank surface.

11. A teaching aid as claimed in claim 10 wherein the backboard further includes, for each representation of a human figure, at least a first holding element for mounting a card on the said figure.

12. A teaching aid as claimed in claim 11 wherein the backboard further includes a second holding element for holding a second card on the figure, the first element arranged to hold a card over the face of the figure and the second element arranged to hold a card over the body of the figure.

13. A teaching aid as claimed in claim 12, further including a set of two cards for each figure adapted to be mounted on the said first element of its respective figure, the cards of each set having information formed thereon to designate in which of the said areas the respective figure is located.

14. A teaching aid as claimed in claim 12 including, for each figure, any set of number cards, each set including one card for each number from one to ten, the said number cards being adapted to be mounted on the said second holding element.

15. A teaching aid as claimed in claim 12 including at least one information window in said backboard, and mounting means for mounting information carrying material behind and exposed through the said information window.

16. A teaching aid as claimed in claim 15 wherein said information carrying material is in the form of a roll, and said mounting means includes a pair of rollers rotatably mounted with respect to the backboard for moving the said roll to change the portion thereof which is exposed through the window.

17. A teaching aid as claimed in claim 15 including two of said information windows.

18. A teaching aid as claimed in claim 17 including in addition to said counting men, at least one scoring area on the said backboard and having three pegs, one for holding cards to designate "hundred's," one for holding cards to designate "ten's," and one for holding cards to designate "one's."

19. A teaching aid as claimed in claim 12 including a storage pocket mounted on said backboard for storing said cards of said first and second holding elements.

20. A teaching aid as claimed in claim 8 wherein said movable means comprises a peg attached to the slidable member and extending outwardly through the open window.

21. A teaching aid as claimed in claim 1 including at least one information window in said backboard, and mounting means for mounting information carrying material behind and exposed through the said information window.

22. A teaching aid as claimed in claim 21 wherein said information carrying material is in the form of a roll, and said mounting means includes a pair of rollers rotatably mounted with respect to the backboard for moving the said roll to change the portion thereof which is exposed through the window.

23. A teaching aid as claimed in claim 21 including two of said information windows.

24. A teaching aid as claimed in claim 1 including in addition to said counting men, at least one scoring area on the said backboard and having three pegs, one for holding cards to designate "hundred's," one for holding cards to designate "ten's," and one for holding cards to designate "one's."

References Cited

UNITED STATES PATENTS

| | | | |
|---|---|---|---|
| 856,041 | 6/1907 | Dunn | 35—32 |
| 3,280,480 | 10/1966 | Rice | 35—31 |

FOREIGN PATENTS

| | | |
|---|---|---|
| 68,435 | 4/1915 | Austria. |
| 295,723 | 5/1929 | Great Britain. |

EUGENE R. CAPOZIO, *Primary Examiner.*

W. H. GRIEB, *Assistant Examiner.*